Nov. 23, 1954  W. CAWI  2,695,177
CLAMPING CHUCK FOR MACHINE TOOLS
Original Filed May 3, 1950
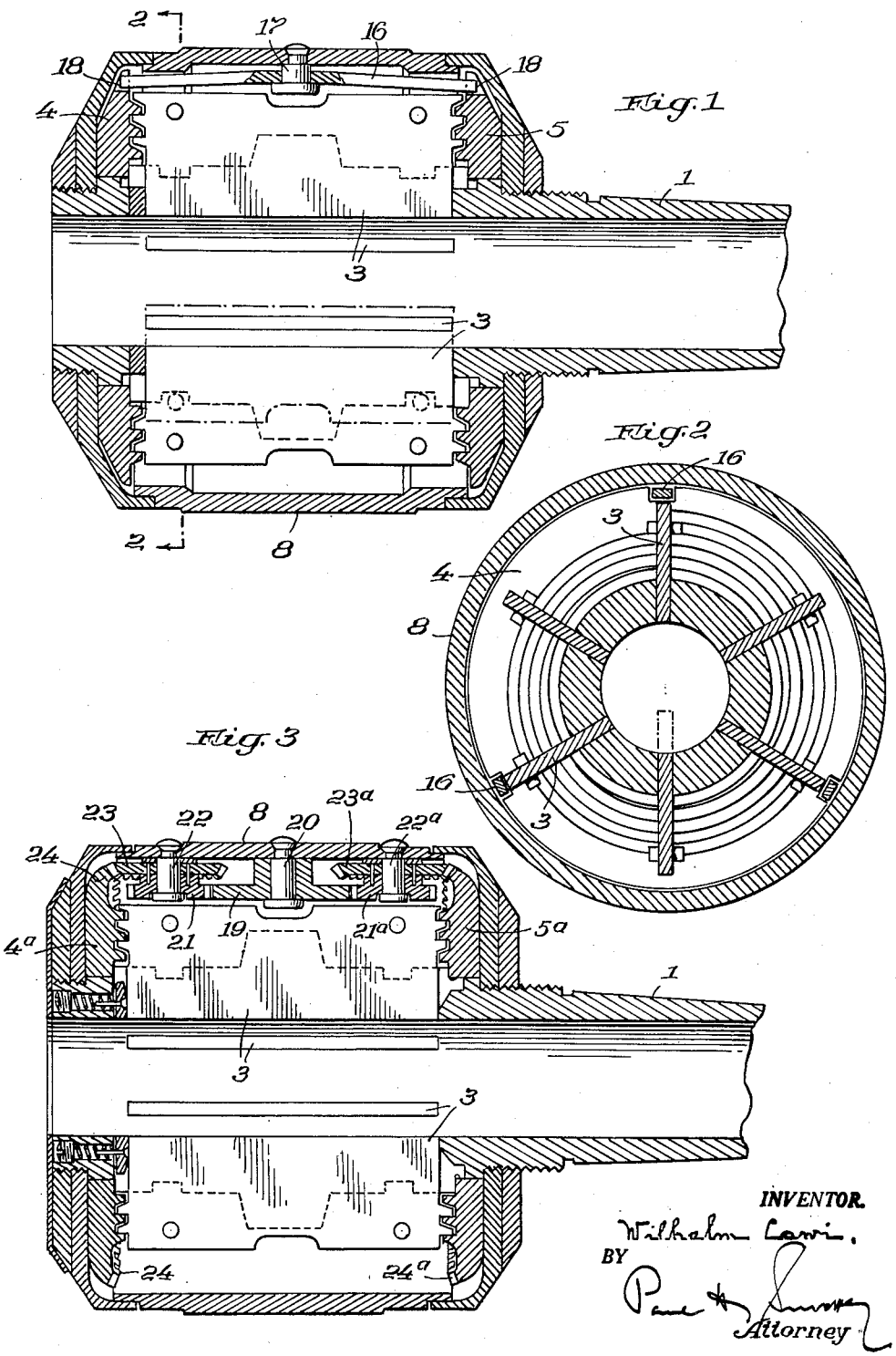
INVENTOR.
Wilhelm Cawi
BY
Attorney

2,695,177

CLAMPING CHUCK FOR MACHINE TOOLS

Wilhelm Cawi, Berlin-Steglitz, Germany, assignor to Johannes Cawi, Fulda, Germany Original application May 3, 1950, Serial No. 159,761. Divided and this application September 5, 1951, Serial No. 245,158

3 Claims. (Cl. 279—66)

This application for patent is a division of my application Serial No. 159,761 filed May 3, 1950, which application matured into Patent No. 2,678,827.

My invention relates to holders or chucks for work pieces of any kind for example tools such as drills or the like. More particularly my invention relates to such holders or chucks wherein clamping jaws are displaceable toward the work piece in radial direction and are operated by toothed face plates which are rotated in unison and which engage each side edge of the jaws effecting their radial displacement. In the known holders or chucks of that type the said jaws are uniformly advanced towards the work piece. If the same is not exactly cylindrical for example more or less conical the uniformly advanced jaws do not contact and clamp the work piece over its entire length.

It is an object of the present invention to avoid the said disadvantage and to provide a chuck or holder in which the clamping jaws will engage and hold the work piece over its entire length even if such work piece should not be exactly cylindrical. To this effect I arrange within the casing of the chuck an operating member which rotates the said face plates in unison until one end of each jaw contacts the tapered or otherwise noncylindrical work piece and which thereafter continues to rotate the face plate engaging the other ends of the jaws until said other ends also contact and hold the work piece.

The said and other objects of my invention will be more fully understood from the following specification when read with the accompanying drawing wherein two embodiments of my invention are illustrated by way of example.

In the drawing

Fig. 1 shows a longitudinal sectional view of one embodiment of my new clamping holder or chuck, Fig. 2 shows a cross section along line 2—2 of Fig. 1, and Fig. 3 shows a longitudinal sectional view of another embodiment of my invention.

The same reference numbers indicate the same or equivalent elements in all figures of the drawing.

As shown in Figs. 1 and 2 the body 1 of the chuck is provided in usual manner with a conical pivot for attaching the chuck to the machine tool. The body 1 contains six longitudinal slots in each of which a jaw 3 is mounted for slidable displacement in radial direction and for a slight tilting movement in a plane passing through the longitudinal axis of the body 1. A casing 8 which is rotatably mounted upon said chuck body 1 houses the said jaws 3 and the two face plates 4, 5, which are also rotatably mounted upon the chuck body 1 and which are provided with a spiral scroll which engages corresponding teeth on the side edges of said jaws. A plurality of two-armed levers 16, for example three, which extend substantially parallel to the axis of the chuck body 1, are tiltably mounted upon the casing 8 by means of pivots 17 and engage with their outer ends slots 18 arranged on the face plates 4 and 5, respectively.

The chuck operates as follows: When the casing 8 is turned upon the chuck body 1 the double-armed levers 16 will follow the casing and, as their ends engage the face plates 4, 5, these plates will be also rotated thereby advancing the jaws in radial direction against the work piece. If this work piece is tampered one end of each jaw will contact the work piece first and the rotation of the respective face plate for example plate 4 will cease. While the rotation of the casing 8 continues the lever 16 will tilt about its end engaging the plate 4 and its other end will continue to turn the other plate 5, thereby advancing the other end of the jaws against the work piece and tilting the jaws to conform to the tapered work piece to be clamped.

The embodiment according to Fig. 3 differs from that described above thereby that instead of the levers toothed gears are used. One or a plurality of toothed gears 19 are provided within the casing 8 and pivotally connected therewith by means of pivots 20. Any desired number of such gears may be distributed around the circumference of the casing. In the drawing one toothed wheel 19 is shown. The toothed wheel 19 meshes with two smaller toothed wheels 21 and 21a rotatable around pivots 22 and 22a fixed to the shell 8 near its opposite ends. The center lines of the pivots 20, 22 and 22a lie substantially in a plane containing the center line of the body of the chuck. Thus, the toothed wheels participate in the rotating movement of the casing but may also turn around their pivots. The toothed wheels 21 and 21a are rigidly connected each with a bevel gear 23 or 23a respectively. The two toothed face plates 4a and 5a serving for advancing and retiring the jaws 3 are provided with a rim 24 or 24a respectively shaped like a bevel gear engaging said bevel gears 23 and 23a.

After the work piece has been inserted between the jaws the casing 8 is rotated. The toothed wheel 19 rotating with the casing drives by means of the described gearing the plates 4a and 5a so that the jaws move towards the work piece. If the work piece is conical the one end of the jaws will first engage it and thereby the respective plate 4a or 5a will be stopped. When the casing continues to rotate, one of the bevel gears 23 or 23a engaging the rim of the stopped plate 4a or 5a is driven by the toothed rim, rotates around its axis and drives the toothed wheel 19 and the toothed wheels 21 and 23 or 21a and 23a, respectively. As these are at the opposite end of the casing, they rotate the non-stopped plate until both ends of the jaws and the whole clamping surface of the chuck tightly contacts the work piece to be clamped.

While specific embodiments of my invention have been shown and described in detail to illustrate the application of the principles of my invention, it will be well understood that the same may be otherwise embodied without departing from such principles and without avoiding the scope of the appended claims.

What I claim as my invention is:

1. A collet chuck particularly for tapered work pieces comprising in combination a tubular chuck body, a plurality of clamping jaws mounted in said body for radial displacement towards the work piece, a pair of face plates rotatably mounted on said body, each of said face plates having scroll-like means engaging the contacting side edges of the clamping jaws to effect their radial displacement upon rotation of said face plates; a casing housing said face plates and rotatably mounted upon the chuck body; and an operating member for said rotatable face plates mounted on and within said casing, said operating member rotating said plates in unison until one end of each jaw contacts the tapered workpiece and continuing to rotate the plate cooperating with the edge at the other ends of the jaws until said other ends also contact the workpiece.

2. A collet chuck particularly for tapered work pieces comprising in combination a tubular chuck body, a plurality of clamping jaws mounted in said body for radial displacement towards the work piece, a pair of face plates rotatably mounted on said body, each of said face plates having scroll-like means engaging the contacting side edges of the clamping jaws to effect their radial displacement upon rotation of said face plates; a casing housing said face plates and rotatably mounted upon the chuck body; and at least one double-armed lever rotatably mounted intermediate said face plates on and within said casing, each of the outer ends of said lever engaging one face plate.

3. A collet chuck particularly for tapered work pieces comprising in combination a tubular chuck body, a plurality of clamping jaws mounted in said body for radial displacement towards the work piece, a pair of face plates rotatably mounted on said body, each of said face plates having scroll-like means engaging the contacting side edges of the clamping jaws to effect their radial displacement upon rotation of said face plates; a casing housing said face plates and rotatably mounted upon the chuck body; at least one gear wheel mounted rotatably upon and within said casing intermediate said face plates; a pair of toothed wheels meshing with said gear wheel in diametrically opposite positions; said toothed wheels being pivoted upon and within said casing; one bevel gear rigidly connected with each of said toothed wheels to rotate therewith; and a bevel gearing on the rim of each face plate to engage one of said bevel gears.

References Cited in the file of this patent

UNITED STATES PATENTS

| Number | Name | Date |
|---|---|---|
| 687,533 | Kitchin | Nov. 26, 1901 |
| 1,181,845 | Church | May 2, 1916 |

FOREIGN PATENTS

| Number | Country | Date |
|---|---|---|
| 145,023 | Germany | 1903 |
| 490,189 | France | Apr. 5, 1919 |
| 531,081 | France | Jan. 6, 1923 |
| 555,215 | France | June 6, 1923 |
| 61,534 | Sweden | Jan. 8, 1925 |